March 12, 1935. C. T. FLETCHER 1,994,069
SHAFT AND METHOD OF MAKING SAME
Filed March 11, 1931 2 Sheets-Sheet 1
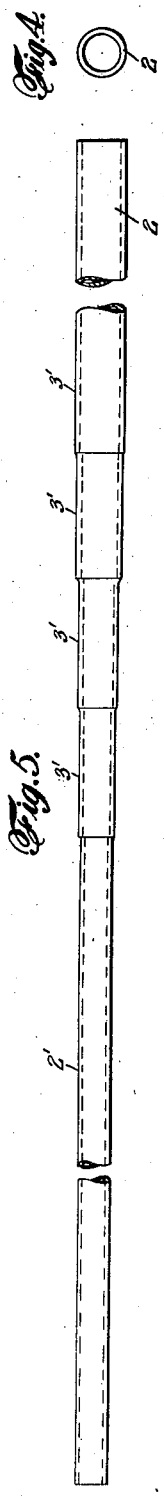
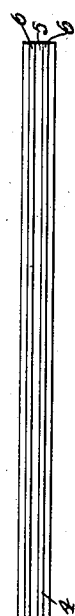
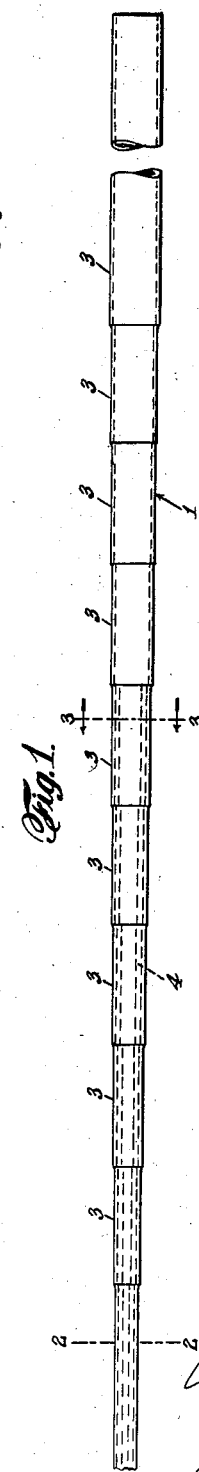
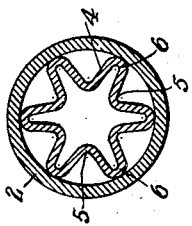
Clarence T. Fletcher INVENTOR
BY Wm. S. Pritchard
ATTORNEY March 12, 1935.  C. T. FLETCHER  1,994,069
SHAFT AND METHOD OF MAKING SAME
Filed March 11, 1931  2 Sheets-Sheet 2
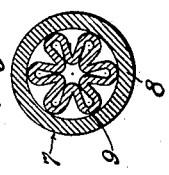
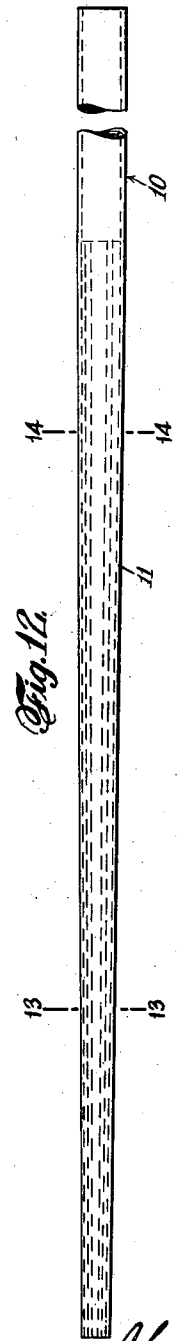
INVENTOR
Clarence T. Fletcher
BY Wm. S. Pritchard
ATTORNEY Patented Mar. 12, 1935

1,994,069

UNITED STATES PATENT OFFICE 1,994,069

SHAFT AND METHOD OF MAKING SAME

Clarence T. Fletcher, New Kensington, Pa., assignor to Aluminum Company of America, Pittsburgh, Pa., a corporation of Pennsylvania Application March 11, 1931, Serial No. 521,755

14 Claims. (Cl. 273—80)

This invention relates to shafts and handles of divers sporting goods and other implements. More particularly, it relates to reinforced metallic tubular shafts or handles of various sporting goods and other implements as well as the method of making the same.

Prior to this invention, shafts of golf clubs have been made of steel tubes. The ordinary tubular steel shafts were, however, objectionable for many reasons, the most important one being that they were either too heavy or too light. When too heavy they were also too rigid, with the result that they did not possess the flexible and torsional characteristics so essential in golf clubs. When made sufficiently light to overcome the disadvantages of the heavy rigid shaft, they were either extremely fragile or the vibrations produced by the impact of striking the ball were transmitted to the hands of the player to such an extent or degree as to cause annoyance or inconvenience.

I have found that I can overcome the above-mentioned disadvantages and provide a tubular metallic shaft closely simulating the wooden shaft and possessing the desired weight and balance as well as the necessary strength, rigidity and torsional characteristics so essential in sporting goods and the like by forming the shaft from a tube of a suitable metallic material such as, for instance, a metallic material having aluminium as the basis thereof and interiorly reinforcing it, either for a portion of its length or throughout its entire length, with a convoluted tubular material having re-entrant or inwardly projecting portions extending longitudinally thereof and separated by longitudinal ribs.

It is therefore an object of this invention to provide a tubular metallic shaft for sporting goods possessing the desired weight and balance and the necessary strength, rigidity and torsional characteristics.

Another object of this invention is to provide a shaft for sporting goods comprising a tube formed of a metallic material, preferably having aluminum as the basis thereof, reinforced on the interior thereof with a tube of a metallic material, preferably also having aluminum as the basis thereof, and having longitudinally extending re-entrant portions separated by longitudinally extending ribs.

An additional object of this invention is to provide a shaft for sporting goods comprising a metallic tube of any suitable contour, such as of uniform cross-section, tapered or stepped portions progressively decreasing in diameter, reinforced on the interior throughout a portion or the entire length thereof with a tube preferably metallic, and having longitudinally extending re-entrant portions separated by longitudinally extending ribs, the reinforcing tube also being shaped, i. e., of uniform cross-section, tapered or stepped to correspond with the shape or form of the exterior tube in which it is disposed.

A still further object of this invention is to provide methods for producing the shafts set forth above.

Other objects will appear from the following description, appended claims and accompanying drawings forming a part of this specification and wherein:

Figure 1 illustrates a shaft having stepped portions and constituting one form of one phase of this invention.

Figure 2 is a section taken on lines 2—2 of Figure 1.

Figure 3 is a section taken on lines 3—3 of Figure 1.

Figure 4 is an end view of a tube from which the shaft is made.

Figure 5 illustrates the tube at the end of the first operation in one of the processes of making the shaft.

Figure 6 is an elevation of the reinforcing element prior to the insertion thereof in the tube illustrated in Figure 5 to produce the shaft shown in Figure 1.

Figure 7 is an end view of the reinforcing element illustrated in Figure 6.

Figure 8 illustrates a shaft of uniform cross-section and constituting another form of one phase of this invention.

Figure 9 is a section on lines 9—9 of Figure 8.

Figure 10 is an end view of the tube from which the shaft illustrated in Figure 8 is produced.

Figure 11 is an end view of the reinforcing element, prior to its insertion in the tube, illustrated in Figure 10.

Figure 12 illustrates a tapering shaft constituting a third modification of one part of this invention.

Figure 13 is a section taken on lines 13—13 of Figure 12.

Figure 14 is a section taken on lines 14—14 of Figure 12.

Figure 15 is an end view of the tube to be processed in the shaft illustrated in Figure 12.

Figure 16 is an end view of the reinforcing element prior to its insertion in the tube illustrated in Figure 15 in the production of the shaft shown in Figure 12.

Figure 17 is a section of a modified form of the reinforcing element.

The invention, as is evident from the objects thereof enumerated above, contemplates in one of its specific embodiments a metallic shaft for sporting goods more closely simulating the wooden shaft and possessing the desired weight and balance as well as the necessary strength, rigidity and torsional characteristics so essential to such goods. These objects are attained by the present invention by forming a shaft consisting of a tube formed of a suitable metallic substance and having a reinforcing element, hereafter more fully described, on the interior thereof.

The shape of the shaft is not restricted to any specific form. For example, the shaft may be cylindrical in shape and of uniform cross-section throughout or it may taper. I prefer, however, to make the shaft stepped; that is, to provide it with a plurality of sections having reduced diameters, the largest diameter being at the top thereof.

The reinforcing element comprises a metallic compressible tubular material having a plurality of re-entrant portions extending longitudinally and separated by longitudinally extending ribs. The reinforcing element in the finished shaft is of uniform cross-section, tapered or stepped corresponding to the contour of the tube in which it is disposed. The reinforcement may extend throughout the entire length of the shaft or a portion thereof. The latter is employed when it is desired to reinforce the shaft at the points of greatest stress or more accurately balance the shaft and/or control the spring or resiliency.

In order to more fully explain the present invention, reference will be had to the accompanying drawings wherein three modifications of the many forms of the present invention are illustrated. It is to be understood that the three modifications of the invention described and illustrated are not limitative of the invention, but are merely illustrative of three representative forms of this invention.

Referring to the drawings, and particularly Figures 1 to 7 inclusive wherein one embodiment of this invention is illustrated, the reference numeral 1 designates a shaft for a golf club prepared in accordance with this invention and on which a head having a shaft socket (not shown) is to be attached. The shaft comprises a metallic tube 2 provided with a plurality of steps or sections 3 of progressively reduced diameters. In the interior of the tube 1 there is positioned a reinforcing element 4 which, in this specific form, extends only over a portion of the length of the shaft, although it is obvious that it may extend throughout the entire length or any portions thereof as desired.

The reinforcing element 4 consists of a compressible tubular material formed with a plurality of re-entrant portions 5 extending longitudinally thereof and separated by outwardly and longitudinally extending ribs 6. The depth of the re-entrant portions 5 is less than half the internal diameter of the outer tube 2 as is shown in Figures 2 and 3. The reinforcing element in the finished shaft is also formed with sections of decreasing diameters to correspond with the sections 3 of the tube 2 in which it is disposed. The larger portion of the reinforcing tube shown in Figure 3 has the sides of each rib well spaced from each other adjacent the center of the tube. Where the outside tube is of a smaller diameter, the sides of each rib will be closer together and in the smallest portion of the outside tube the side portions of each rib may be in contact as shown in Figure 2.

The reinforcing element is prepared by passing a tubular material, preferably cylindrical in shape, through a die having a non-circular aperture, preferably hexagonal in shape, at its point of egress, the circumference of the tube being greater than the perimeter of the die at its smallest portion. Since the specific method of producing the reinforcing element forms no essential part of this invention, further description thereof is deemed unnecessary.

To produce the shaft 1, the tube 2 formed of any suitable metallic material and preferably also of uniform diameter, is passed through a die or plurality of dies to progressively reduce the diameter thereof and form the stepped portions 3' at the upper end of the shaft and in which the reinforcing element 4 is not to extend. The portion 2' of the tube in which the reinforcing element 4 is to be positioned is also reduced in diameter so that the reinforcing element may be inserted and tightly fit therein. The reinforcing element 4, produced as above described, is inserted in the portion 2' of the tube and the thus reinforced portion is then subjected to a drawing process wherein the portion 2', together with the reinforcing element 4 therein, is stepped to produce the shaft 1 illustrated in Figure 4.

During the production of the last-named stepped portions, the reinforcing element 4 is also provided with stepped portions corresponding to those of the tube 2 and is furthermore tightly secured in position. The reduction in size of the reinforcing element is clearly shown in Figures 2 and 3.

When the reinforcing element is to extend throughout the entire length of the shaft the above described procedure is slightly modified. The reinforcing element is inserted in a tube of suitable diameter at the very beginning of the process and prior to the production of any stepped portions. The reinforced tube is then subjected to the operations wherein it is provided with the successive portions of reduced diameters.

Referring now to Figure 8 and Figure 9, there is illustrated a second modification of a golf shaft produced in accordance with this invention. In this form, the shaft 7 comprises a tubular material 8 of uniform diameter reinforced with the core 9.

To prepare the shaft illustrated in Figure 8, the metallic tube 8, preferably of appropriate and uniform diameter, is provided and in the interior thereof a core 9' of such size as to snugly fit therein is inserted. The core 9' is similar in form and prepared in the same manner as the reinforcing element 4 above described. After the core 9' has been positioned in the tube 8, the reinforced tube is passed through a die of uniform diameter, which is less than that of the tube 8, whereby the tube 8 is reduced in diameter substantially uniformly throughout its length. The reduction in diameter serves to tightly wedge the core within the tube. If the diameter of the tube 8 is reduced to such an extent that the core 9' is also compressed, then the latter will assume the shape illustrated in Figure 9.

Referring now to Figures 12, 13 and 14 wherein a third modification of the present invention is described, it will be observed that the shaft 10 has a gradually tapering contour. To prepare this shaft, a tube 11 of uniform diameter is provided and a core 12, similar to those previously described, inserted therein as described in a previous modification. The reinforced tube is then subjected to a process whereby the tube is given the tapered form. In this process it is apparent that the core 12 is also made to taper correspondingly.

In each of the modifications above described, the tight fit of the core or reinforcement within the tube is secured by the simultaneous processing of the reinforced tube. Though this is the preferred form of making the shaft, the invention is not restricted thereto. Both the exterior tube and the reinforcement may be separately processed to the desired shapes and then the core forced or press-fitted into the tube in the desired position.

It is obvious that the shaft need not be cylindrical but may be of any other desired form.

In the preceding description the reinforcing element was described as being a tubular material having longitudinally extending re-entrant portions separated by longitudinally extending ribs. This definition is intended not only to embrace the star-shaped elements illustrated in Figures 7, 11 and 16, but also the clover-shaped variety shown in Figure 17.

In the foregoing description the tube and reinforcing element are described as being formed of a metallic material. Though it is apparent that numerous metals may be successfully employed, I prefer to use tubes and reinforcing elements formed of aluminium or aluminum alloys since with such materials I can more closely simulate the wooden shafts.

Aluminum and aluminum alloy tubes, though light in weight when fabricated into shafts, are extremely strong, rugged and durable and possess the desirable characteristics of flexibility and torsion. By reinforcing them in accordance with this invention, the weight thereof may be increased to more nearly that of a wooden shaft and the strength materially increased. Likewise, the reinforcement may be effected with the idea of balancing the club, in which case the shaft is reinforced at a portion of its length. Usually such reinforcement is made at that portion of the shaft which is subjected to the greatest stress when used or where decreased resiliency is desired.

The reinforcing element is preferably also made of aluminum or an aluminum alloy since it provides the necessary compressible characteristics.

Since it is obvious that various changes may be made in the specific details hereinabove set forth, this invention is not restricted thereto except as set forth in the appended claims.

I claim:

1. A shaft for sporting goods and other implements comprising a metallic tube reinforced on the interior thereof with a tubular material having longitudinally extending re-entrant portions separated by longitudinally extending ribs.

2. A shaft for sporting goods and other implements comprising a metallic tube reinforced on the interior thereof with a tubular material having longitudinally extending re-entrant portions separated by longitudinally extending ribs, the reinforcing element being shaped to correspond with the shape of the tube.

3. A shaft for sporting goods and other implements comprising a metallic tube having stepped portions of reduced diameters and reinforced on the interior thereof with a corresponding stepped tubular material having longitudinally extending re-entrant portions separated by longitudinally extending ribs.

4. A shaft for sporting goods and other implements comprising a metallic tapering tube reinforced on the interior thereof with a correspondingly tapering tubular material having longitudinally extending re-entrant portions separated by longitudinally extending ribs.

5. A shaft for sporting goods and other implements comprising a metallic outer tube reinforced on the interior thereof with an inner tube having longitudinally extending re-entrant portions separated by longitudinally extending ribs, the depth of each of said re-entrant portions being less than half the internal diameter of the metallic tube and said re-entrant portions being unsupported adjacent the center of the metallic tube in at least a portion of the said shaft.

6. A shaft for sporting goods and other implements comprising a metallic outer tube reinforced on the interior thereof with an inner tube having longitudinally extending re-entrant portions separated by longitudinally extending ribs, each rib comprising sides spaced apart and free to move toward each other adjacent the center of the inner tube in at least a portion of the said shaft.

7. A shaft for sporting goods and other implements comprising a metallic outer tube having different diameters at different places in the length of said outer tube and reinforced on the interior thereof with an inner tube having longitudinally extending re-entrant portions separated by longitudinally extending ribs, each rib comprising a pair of sides having portions spaced apart adjacent the center of the inner tube in at least a portion of the said shaft, the space between said portions varying in accordance with corresponding different diameters of the outer tube.

8. A shaft for sporting goods and other implements comprising a metallic outer tube having stepped portions of reduced diameters and reinforced on the interior thereof with a corresponding stepped inner tube having longitudinally extending re-entrant portions separated by longitudinally extending ribs, each rib comprising a pair of sides having portions spaced apart adjacent the center of the inner tube in at least a portion of the said shaft, the space between said portions varying in accordance with corresponding different diameters of stepped portions of the outer tube.

9. A shaft for sporting goods and other implements comprising a metallic tapering outer tube reinforced on the interior thereof with a correspondingly tapering inner tube having longitudinally extending re-entrant portions separated by longitudinally extending ribs, each rib comprising a pair of sides having portions spaced apart adjacent the center of the inner tube in at least a portion of the said shaft, the space between said portions varying in accordance with corresponding different diameters of the tapering outer tube.

10. A shaft for sporting goods and other implements comprising a metallic outer tube having stepped portions of reduced diameters and reinforced on the interior thereof with a corresponding stepped inner tube having longitudinally extending re-entrant portions, the said re-entrant portions being spaced apart adjacent the center of the inner tube in a part of the tube having relatively large diameters and pressed into contact adjacent the center of the inner tube in a part of the tube having relatively small diameters.

11. A shaft for sporting goods and other implements comprising a metallic tapering outer tube reinforced on the interior thereof with a correspondingly tapering inner tube having longitudinally extending re-entrant portions, the said re-entrant portions being spaced apart adjacent the center of the inner tube in a part of the tube having relatively large diameters and pressed into contact adjacent the center of the inner tube in a part of the tube having relatively small diameters.

12. In a golf club, a tubular metallic shaft and a metallic reinforcing member wedged within said shaft, said reinforcing member having longitudinally extending spaced portions engaging the wall of the shaft.

13. A shaft for sporting goods and other implements comprising a metallic tube reinforced on the interior thereof with a tubular material having longitudinally extending re-entrant portions separated by longitudinally extending ribs, the reinforcement being disposed at least at that portion of the shaft which is subjected to the greatest stress.

14. In a golf club, the combination of a head provided with a shaft socket, a tubular metallic shaft disposed in said socket, and a reinforcing metallic member wedged within said shaft to project into and above the head socket, said reinforcing member having longitudinally extending spaced portions engaging the wall of the shaft.

CLARENCE T. FLETCHER.